United States Patent
Kiuchi

(10) Patent No.: US 9,935,717 B2
(45) Date of Patent: Apr. 3, 2018

(54) OPTICAL SYNTHESIZER

(71) Applicant: NATIONAL INSTITUTES OF NATURAL SCIENCES, Tokyo (JP)

(72) Inventor: Hitoshi Kiuchi, Tokyo (JP)

(73) Assignee: National Institutes of Natural Sciences, Tokyo (JP)

( * ) Notice: Subject to any disclaimer, the term of this patent is extended or adjusted under 35 U.S.C. 154(b) by 0 days.

(21) Appl. No.: 15/296,919

(22) Filed: Oct. 18, 2016

(65) Prior Publication Data
US 2017/0180054 A1    Jun. 22, 2017

(30) Foreign Application Priority Data
Dec. 16, 2015 (JP) .................. 2015-245004

(51) Int. Cl.

| | |
|---|---|
| *H04B 10/572* | (2013.01) |
| *G01J 1/42* | (2006.01) |
| *G02F 1/225* | (2006.01) |
| *H04B 10/50* | (2013.01) |
| *H04B 10/516* | (2013.01) |
| *G02F 1/21* | (2006.01) |

(52) U.S. Cl.
CPC .......... *H04B 10/572* (2013.01); *G01J 1/4228* (2013.01); *G02F 1/2255* (2013.01); *H04B 10/503* (2013.01); *H04B 10/516* (2013.01); *G02F 2001/212* (2013.01); *G02F 2203/56* (2013.01)

(58) Field of Classification Search
CPC ... H04B 10/572; H04B 10/503; H04B 10/516
See application file for complete search history.

(56) References Cited

U.S. PATENT DOCUMENTS

| | | | |
|---|---|---|---|
| 5,153,933 A | 10/1992 | Smith et al. | |
| 7,269,351 B2* | 9/2007 | Oberland | H04B 10/506 398/182 |

(Continued)

FOREIGN PATENT DOCUMENTS

| | | |
|---|---|---|
| JP | 4-503868 A | 7/1992 |
| JP | 11340926 A | 12/1999 |

(Continued)

OTHER PUBLICATIONS

Kiuchi et al., "High Extinction Ratio Mach-Zehnder Modulator Applied to a Highly Stable Optical Signal Generator," IEEE Transactions on Microwave Theory and Techniques, vol. 55, No. 9, Sep. 2007, pp. 1964-1972.

*Primary Examiner* — Dzung Tran
(74) *Attorney, Agent, or Firm* — Birch, Stewart, Kolasch & Birch, LLP

(57) ABSTRACT

In an optical synthesizer, a laser source outputs a laser. An optical modulator modulates the frequency of the laser to output a light including a first frequency component. An optical filter extracts the first frequency component from the output of the optical modulator. An optical comb generator generates an optical comb based on the laser and a predetermined driving signal. A variable-wavelength narrowband filter extracts a second frequency component from the optical comb. An optical-electric converter outputs an electric signal based on the frequency difference between the first and second frequency components.

5 Claims, 2 Drawing Sheets

(56) References Cited

U.S. PATENT DOCUMENTS

| | | | | |
|---|---|---|---|---|
| 2003/0090767 | A1* | 5/2003 | Yap | G02B 6/2861 |
| | | | | 398/183 |
| 2005/0018724 | A1* | 1/2005 | Da Silva | H04B 10/572 |
| | | | | 372/32 |
| 2015/0358086 | A1* | 12/2015 | Foster | H04B 10/5561 |
| | | | | 398/115 |

FOREIGN PATENT DOCUMENTS

| | | |
|---|---|---|
| JP | 2004512556 A | 4/2004 |
| JP | 2005353769 A | 12/2005 |
| JP | 2007-333753 A | 12/2007 |
| WO | WO 2008029455 A1 | 3/2008 |

* cited by examiner

OPTICAL SYNTHESIZER

BACKGROUND OF THE INVENTION

Field of the Invention

This invention is related to an optical synthesizer and in particular to one that outputs an electric signal based on a frequency difference between two light waves.

Description of the Related Art

Generation of high-frequency signals including those in the terahertz region has become indispensable in state of the art technical fields. A synthesizer as a measurement device generates signals of desired frequencies with high frequency resolutions. Electric signals (microwaves or millimeter waves) can be generated by a photomixer performing optical-electric conversion based on the difference between two coherent optical signals. Recently, the frequency bandwidth for photomixers has reached the terahertz region and photomixers are now more readily available.

Conventional optical synthesizers that perform phase synchronization control for a laser source by using a harmonic mixer are known. FIG. 3 shows an exemplary construction for a phase locked loop used for such an optical synthesizer. A highly stable laser from a reference laser source and a variable-wavelength laser are combined. The combined signal is distributed in two paths, one of which is sent to an output and the other to an optical-electric converter. After a frequency difference between the two light waves is converted into an electric signal (microwaves or millimeter waves), the harmonic mixer performs frequency conversion by using this electric signal and an external microwave signal, and a residual phase is used to perform phase synchronization control for the variable wavelength laser. An example of such a construction is disclosed in Cliche, J. and Shillue, B., "Precision timing control for radio astronomy, maintaining femtosecond synchronization in Atacama Large Millimeter Array", IEEE control system magazine, pp. 19-26, 2006.

However, conventional optical synthesizers have a problem that the width of the frequency range of the signals that can be generated is limited.

SUMMARY OF THE INVENTION

The present invention is made in order to solve this problem and is aimed at providing an optical synthesizer which can generate signals in a wider frequency range.

In order to solve the above problem, an optical synthesizer related to the present invention comprises:
- a light source that outputs a laser;
- an optical modulator that modulates a frequency of the laser based on a variable input signal to output a light including a first frequency component;
- a first optical filter that extracts the first frequency component from the output of the optical modulator;
- an optical comb generator that generates an optical comb based on the laser and a predetermined driving signal;
- a second optical filter that extracts a second frequency component from the optical comb; and
- an optical-electric converter that outputs an electric signal based on a frequency difference between the first and second frequency components.

The variable input signal and the driving signal may be phase-synchronized with an identical reference signal.

The second optical filter may be a variable-wavelength bandpass filter.

The optical modulator may be a Mach-Zehnder optical modulator operable in a full-bias mode.

The variable frequency range width of the first frequency component may be equal to or greater than the frequency interval of the optical comb.

According to the optical synthesizer related to the present invention, a difference signal between two coherent light wave signals is generated by combining respective waves from an optical modulator and an optical comb generator having a common laser as a light source, so signals in a wider frequency range can be generated.

DESCRIPTION OF THE PREFERRED EMBODIMENTS

First, an overview and operational principle of the invention are explained. An optical synthesizer related to the present invention uses a common laser as a light source and has a structure for extracting and combining respective single frequency components from an output of a Mach-Zehnder optical modulator driven in phase-synchronization with a reference signal and an output of an optical comb generator driven in phase-synchronization with the same reference signal. The optical synthesizer has a feature that the optical modulator is in charge of high frequency resolution and the optical comb generator is in charge of a frequency dynamic range. According to such a construction, the optical synthesizer can have both a high frequency resolution and wide frequency characteristics from a low frequency to terahertz.

First Embodiment

Figure 1:
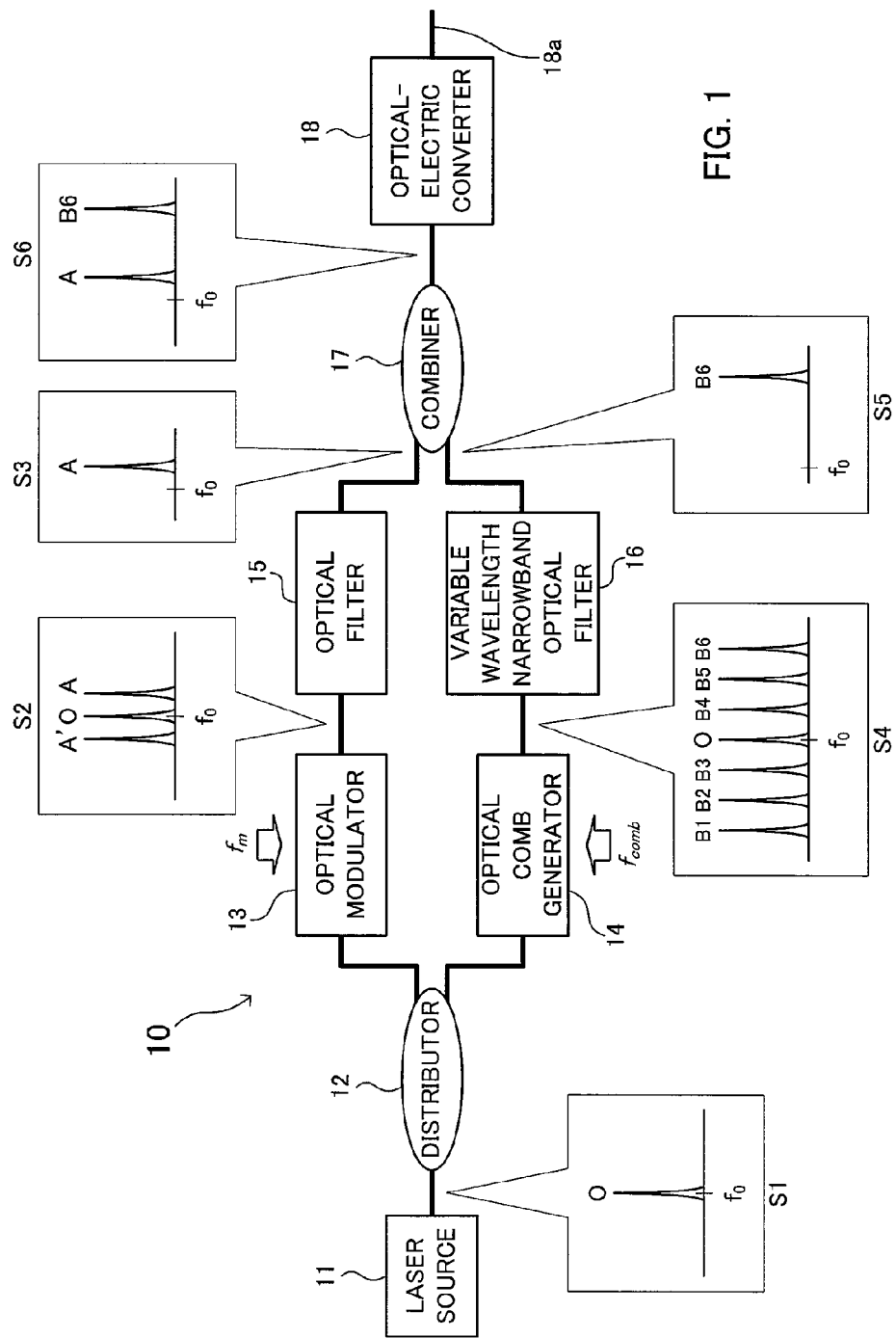
FIG. 1 shows an example construction of an optical synthesizer related to a first embodiment of the present invention.

Hereinafter, a first embodiment of the present invention will be explained. FIG. 1 shows an example construction of an optical synthesizer 10 related to the first embodiment of the present invention.

The optical synthesizer 10 comprises a laser source 11, a distributor 12, an optical modulator 13, an optical comb generator 14, an optical filter 15 (first optical filter), a variable-wavelength narrowband optical filter 16 (second optical filter), a combiner 17 and an optical-electric converter 18.

The laser source 11 outputs a laser. A spectrum S1 of the laser has a single frequency component O. The frequency component O includes light of a predetermined frequency $f_0$. Note that, although "frequency component" herein ideally means a component including only a single frequency, this may substantially mean a component having a bandwidth permitting realization of functions of the optical synthesizer 10 described herein.

The distributor 12 distributes an inputted laser to two outputs. One of the distributed outputs is inputted to the optical modulator 13 and the other is inputted to the optical comb generator 14. Thus, it can be said that a common laser is input to the optical modulator 13 and the optical comb generator 14.

The optical modulator 13 modulates the laser, inputted from the distributor 12, based on a variable input signal and outputs a modulated light. In the present embodiment, the optical modulator 13 modulates the frequency of the laser. Accordingly, the frequency of the outputted light would be determined in response to the frequency of the variable input signal. The variable input signal is, for example, phase-synchronized with a predetermined reference signal. As a specific example for the optical modulator 13, a Mach-Zehnder optical modulator can be used. The Mach-Zehnder optical modulator can be driven by using a frequency-variable high-frequency-resolution microwave signal as the variable input signal.

A specific example of a construction for the Mach-Zehnder optical modulator is, for example, disclosed in Kiuchi, H., Kawanishi, T., Yamada, M., Sakamoto, T., Tsuchiya, M., Amagai, J. and Izutsu, M., "High Extinction Ratio Mach-Zehnder Modulator Applied to a Highly Stable Optical Signal Generator", IEEE Trans. Microwave Theory and Techniques, vol. 55, no. 9, pp. 1964-1972, 2007.

Although the Mach-Zehnder optical modulator can operate in either of a null-bias mode or a full-bias mode, a case wherein the optical modulator 13 operates in the full-bias mode is explained for the present embodiment. Either mode can be used if the null-bias mode has a sufficiently wide bandwidth characteristic, for example so that it can realize a condition shown in FIG. 2(*a*). A spectrum S2 of the output of the optical modulator 13 includes the frequency component O and frequency components A and A' corresponding to modulated signals, where the frequency of the frequency component A is higher than that of the frequency component A'.

If a modulating frequency for the optical modulator 13 is represented by $f_m$, the frequency difference in the modulated signal would be four times the modulating frequency $f_m$ in the full-bias mode, i.e. the frequency difference between the frequency components O and A is twice $f_m$. Accordingly, frequency resolution at the output of the optical modulator 13 would be twice the frequency resolution of the modulating frequency $f_m$.

Figure 2:
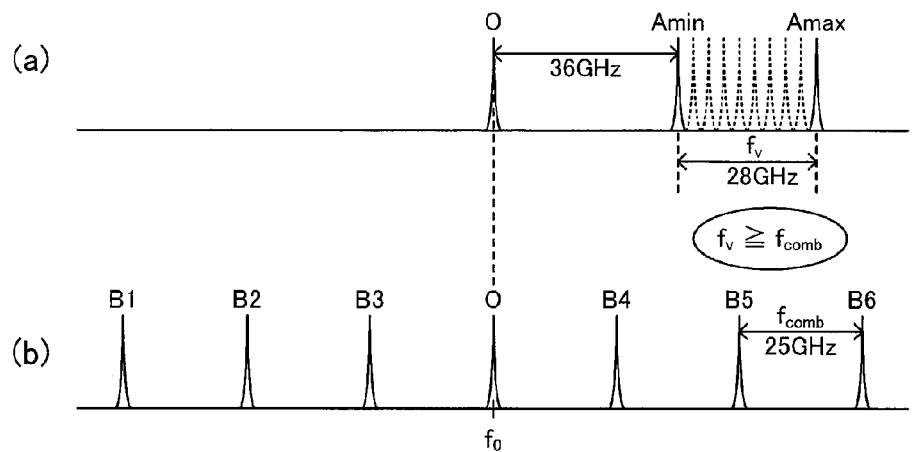
FIG. 2 shows the relationship among frequency components in an output of an optical modulator and an optical comb generator.
Figure 3:
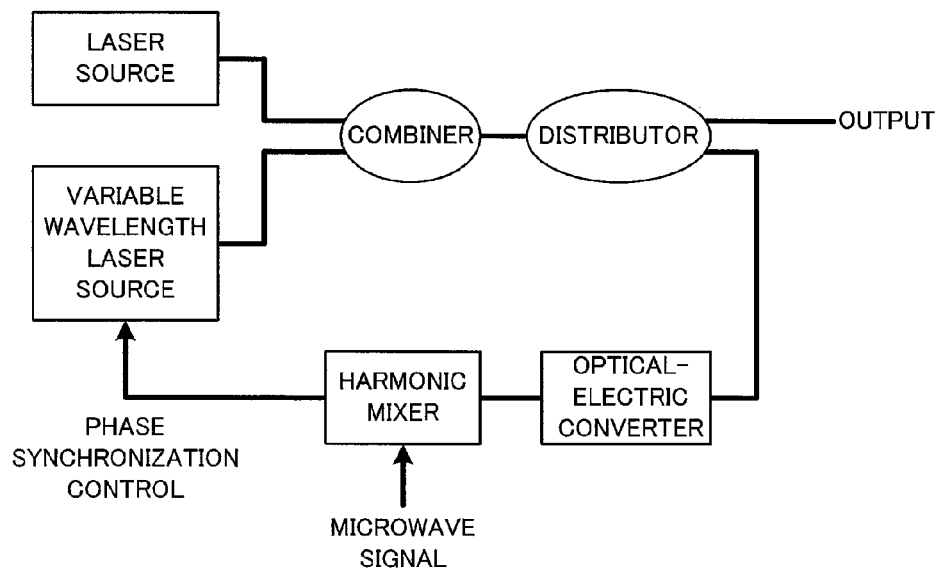
FIG. 3 shows an exemplary construction of a phase locked loop used for a conventional optical synthesizer.

FIG. 2 (*a*) shows an example relationship between the frequency component O and the frequency component A. In the present embodiment, for example, $f_m=18+\alpha$ [GHz] and $0 \leq \alpha \leq 14$ [GHz]. In this case $18 \leq f_m \leq 32$ [GHz]. Also, in this case, the frequency of the frequency component A is variable within a range from $f_0+36$ [GHz] corresponding to $\alpha=0$ (noted Amin in the figure) to $f_0+36+28=f_0+64$ [GHz] corresponding to $\alpha=14$ (noted Amax in the figure). Accordingly, in this case, a variable frequency range width $f_v$ of the frequency component A is $f_v=(f_0+64)-(f_0+36)=28$ [GHz].

The optical filter 15 extracts, from the output of the optical modulator 13, one modulated wave (first frequency component) which is not the input laser. In the present embodiment, the optical filter 15 extracts the frequency component A. Such optical filter 15 can be realized by using a fixed wavelength high-pass filter having a cut-off frequency of $f_0+18$ [GHz]. In this case, a spectrum S3 of the output of the optical filter 15 substantially includes the frequency component A only.

On the other hand, the optical comb generator 14 generates an optical comb based on the laser inputted from the distributor 12 and a predetermined driving signal. The driving signal has a fixed frequency $f_{comb}$ corresponding to an interval between frequency components of the optical comb. Also, the driving signal is phase-synchronized with an external reference signal. The driving signal used in the present embodiment is phase-synchronized with the same reference signal as used for phase-synchronization of the variable input signal for the optical modulator 13.

The output of the optical comb generator 14, i.e. the optical comb, includes a plurality of frequency components. In the example of FIG. 1, a spectrum S4 of the optical comb includes seven frequency components, i.e. the frequency components O and B1-B6. However, the number of the frequency components included in the optical comb is not limited to seven.

FIG. 2(*b*) shows an example relationship among the frequency components of the optical comb. In this example, the frequency components are spaced apart from each other by $f_{comb}=25$ [GHz]. In the present embodiment, the variable frequency range width $f_v$ of the frequency component A is equal to or greater than the frequency interval $f_{comb}$ of the optical comb. In other words, $(\alpha max - \alpha min) \times 2 \geq f_{comb}$ where $f_m=18+\alpha$, a minimum value for $\alpha$ is $\alpha min=0$ and a maximum value for $\alpha$ is $\alpha max=14$.

A known optical comb generator can be used as the optical comb generator 14. The driving signal is for example a microwave. As a specific scheme used by the optical comb generator 14 for generating the optical comb, various schemes may be used such as a scheme using a phase modulator and a Fabry-Perot resonator, a scheme using a pulse laser and a non-linear fiber, etc.

The variable-wavelength narrowband optical filter 16 is a bandpass filter and extracts one frequency component (second frequency component) from the optical comb. Which of the frequency components O and B1-B6 is to be extracted can be controlled at will and for example determined in response to a control signal inputted externally. In the example of FIG. 1, the frequency component B6 is extracted so that a spectrum S5 at the output of the variable-wavelength narrowband optical filter 16 substantially includes only the frequency component B6.

As the variable-wavelength narrowband optical filter 16, for example, a narrowband FBG (Fiber Bragg Grating) reflection filter combined with an optical circulator can be used. Alternatively, the variable-wavelength narrowband optical filter 16 may be an AWG (Arrayed Waveguide Grating) filter, an LCOS (Liquid Crystal On Silicon) filter, dynamic optical filter arrays (DOFA), etc.

The combiner 17 combines the output of the optical filter 15 and the output of the variable-wavelength narrowband optical filter 16. In the example of FIG. 1, a spectrum S6 at the output of the combiner 17 includes the frequency components A and B6.

The optical-electric converter 18 performs optical-electric conversion on the output of the combiner 17 to generate an electric signal. For example, based on the frequency difference between the two frequency components (the frequency components A and B6 in the example of FIG. 1) included in the output of the combiner 17, the optical-electric converter 18 outputs an electric signal 18*a* having a frequency corresponding to the frequency difference. The frequency $f_{out}$ of the electric signal 18*a* is $f_{out}=|f_{comb} \times N - 2f_m|$ where N is an integer identifying a frequency component of the optical comb and N=−3, −2, −1, 0, 1, 2, 3 respectively for the frequency components B1, B2, B3, O, B4, B5, B6 in the example of FIG. 2(*b*).

Thus, the optical synthesizer 10 related to the first embodiment can output an electric signal having any frequency.

It can be said that the above optical synthesizer 10 has a structure wherein the optical modulator 13 realizes a high frequency resolution and the optical comb generator 14 realizes a frequency dynamic range.

According to the above optical synthesizer 10, the variable input signal used for modulation by the optical modulator 13 and the driving signal for driving the optical comb generator 14 are phase-synchronized with an identical reference signal, so no phase locked loop is necessary. Also, compared with a construction using a phase locked loop, loss of phase synchronization can be avoided or reduced more easily.

With the above optical synthesizer 10, a high frequency resolution can be obtained over a wide frequency range. For example, if the frequency resolution of the variable input signal for the optical modulator 13 is 1 mHz, a frequency resolution of about 2 mHz can be obtained over a wide range from a low frequency region to a terahertz region.

Further, with the above optical synthesizer 10, an operation in the full-bias mode of the Mach-Zehnder optical modulator 13 is used in order to generate one of the frequency components (the frequency component A in FIG. 1), enabling a seamless frequency control over a relatively wide range. This facilitates realization of a high-frequency-resolution optical signal over a bandwidth wider than the frequency interval of the optical comb.

Also, according to the above optical synthesizer 10, no multiplication technique (such as for the case wherein an electric signal is used) is required, so spurious components in the output signal can be suppressed.

In the first embodiment, the variable frequency range width $f_v$ of the frequency component A is equal to or greater than the frequency interval $f_{comb}$ of the optical comb. By designing in this way, the optical synthesizer 10 can change the frequencies seamlessly over an entire operational frequency region. However, if a seamless variable frequency range is not required, $f_v$ may be less than $f_{comb}$.

In the first embodiment, the optical modulator 13 operates in the full-bias mode. Accordingly, the interval between the frequency components included in the output of the optical modulator 13 becomes greater compared with the null-bias mode, so high suppression of undesired waves can easily be obtained by the optical filter 15. However, if suppression of the undesired waves by the optical filter 15 is not important, the optical modulator 13 may operate in the null-bias mode.

In the first embodiment, the optical filter 15 extracts the frequency component A from the output of the optical modulator 13. As an alternative, the optical filter 15 may extract the frequency component A'.

In the first embodiment, the variable-wavelength narrowband optical filter 16 is used as the second optical filter. However, if the frequency dynamic range does not have to be wide, an alternative embodiment may be constructed to use a fixed-wavelength optical filter so that a single fixed frequency component is extracted from the optical comb.

The present invention can for example be applied in the fields of high-frequency astronomy and ultra-high-speed communication. Also, the present invention can be applied in fields utilizing waves from microwaves to terahertz waves.

What is claimed is:

1. An optical synthesizer comprising:
   a light source that outputs a laser beam;
   a first optical path including,
      an optical modulator that modulates a frequency of the laser beam based on a variable input signal to output a light including a first coherent frequency component of the laser beams, and
      a first optical filter that extracts the first coherent frequency component from an output of the optical modulator;
   a second optical path parallel to the first optical path and including:
      an optical comb generator that receives the laser beam output from the light source and generates an optical comb from the laser beam based on a predetermined driving signal, and
      a second optical filter that extracts a second coherent frequency component of the laser beam from the optical comb; and
   an optical-electric converter operatively connected to the first and second optical paths that outputs an electric signal based on a frequency difference between the first and second frequency components.

2. The optical synthesizer of claim 1, wherein the variable input signal and the driving signal are phase-synchronized with an identical reference signal.

3. The optical synthesizer of claim 1, wherein the second optical filter is a variable-wavelength bandpass filter.

4. The optical synthesizer of claim 1, wherein the optical modulator is a Mach-Zehnder optical modulator operable in a full-bias mode.

5. The optical synthesizer of claim 1, wherein a variable frequency range width of the first frequency component is equal to or greater than a frequency interval of the optical comb.

* * * * *